(12) United States Patent
Suyama et al.

(10) Patent No.: US 9,876,350 B2
(45) Date of Patent: Jan. 23, 2018

(54) POWER SUPPLY SYSTEM

(75) Inventors: Atsushi Suyama, Osaka (JP); Yosuke Tanida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 542 days.

(21) Appl. No.: 13/824,918

(22) PCT Filed: Sep. 28, 2011

(86) PCT No.: PCT/JP2011/072195
§ 371 (c)(1),
(2), (4) Date: Mar. 18, 2013

(87) PCT Pub. No.: WO2012/043636
PCT Pub. Date: Apr. 5, 2012

(65) Prior Publication Data
US 2013/0181518 A1    Jul. 18, 2013

(30) Foreign Application Priority Data
Sep. 28, 2010  (JP) .................................. 2010-217955

(51) Int. Cl.
*H02J 7/34* (2006.01)
*H02J 1/00* (2006.01)
*H02J 3/32* (2006.01)

(52) U.S. Cl.
CPC ........ *H02J 1/00* (2013.01); *H02J 3/32* (2013.01); *H02J 7/34* (2013.01); *Y10T 307/344* (2015.04)

(58) Field of Classification Search
CPC ............ H02J 3/32; H02J 7/34; Y10T 307/344
See application file for complete search history.

(56) References Cited

U.S. PATENT DOCUMENTS 5,297,664 A * 3/1994 Tseng ............... B60L 3/0069
                                           194/217
6,020,734 A * 2/2000 Grisham ........... G01R 21/1338
                                           324/103 R
(Continued)

FOREIGN PATENT DOCUMENTS

CN    101388477 A  *  3/2009  ............ H01M 10/44
JP    11-041831    *  2/1999  ............... H02J 7/34
(Continued)

*Primary Examiner* — Thienvu Tran
*Assistant Examiner* — Pinping Sun
(74) *Attorney, Agent, or Firm* — McDermott Will & Emery LLP (57) ABSTRACT

[Problem] To provide a power supply system which effectively utilizes a power storage unit and also limits degradation of the power storage unit.
[Solution] A power supply system (1) is provided with: a power storage unit (2) for charging supplied electric power and supplying the charged electric power by means of discharge; and a power storage unit controller (3) for controlling the discharging of the power storage unit (2). The power storage unit controller (3) sets a discharge period during which the power storage unit (2) can be discharged. Furthermore, during the discharge period, the power storage unit controller (3) determines the electric energy to be supplied by means of the discharging of the power storage unit (2) during the remaining discharge period on the basis of the remaining discharge period and the electric energy that can be discharged by the power storage unit (2).

7 Claims, 5 Drawing Sheets (56) References Cited

U.S. PATENT DOCUMENTS

| | | | |
|---|---|---|---|
| 6,618,681 B2 * | 9/2003 | Hoenig et al. | 702/63 |
| 6,724,172 B2 * | 4/2004 | Koo | H02J 7/0022 320/128 |
| 7,800,247 B2 * | 9/2010 | Chang | H02J 3/32 307/44 |
| 8,183,826 B2 * | 5/2012 | Tuffner | H02J 7/34 320/107 |
| 8,200,209 B2 * | 6/2012 | Pehrsson | G01R 31/3648 320/132 |
| 2006/0091863 A1 * | 5/2006 | Melichar | G01R 31/361 320/132 |
| 2009/0108810 A1 * | 4/2009 | Sawyers | H01M 10/441 320/137 |
| 2012/0319642 A1 * | 12/2012 | Suyama | H02J 3/32 320/101 |

FOREIGN PATENT DOCUMENTS

| | | | | |
|---|---|---|---|---|
| JP | 2000-069673 A | | 3/2000 | |
| JP | 2000069673 A | * | 3/2000 | H02J 3/28 |
| JP | 2001-008385 A | | 1/2001 | |
| JP | 2001008385 A | * | 1/2001 | H02J 15/00 |
| JP | 2003-125537 A | | 4/2003 | |
| JP | 2005-143218 A | | 6/2005 | |
| JP | 2007-060796 A | | 3/2007 | |
| JP | 2007060796 A | * | 3/2007 | H02J 9/06 |
| JP | 2007-274750 A | | 10/2007 | |

* cited by examiner

FIG.8

POWER SUPPLY SYSTEM

RELATED APPLICATIONS

This application is the U.S. National Phase under 35 U.S.C. § 371 of International Application No. PCT/JP2011/072195, filed on Sep. 28, 2011, which in turn claims the benefit of Japanese Application No. 2010-217955, filed on Sep. 28, 2010, the disclosures of which Applications are incorporated by reference herein.

TECHNICAL FIELD

The present invention relates to a power supply system that uses electric power supplied by discharging a storage battery.

BACKGROUND ART

In recent years, there have been proposals for a power supply system that supplies electric power to be consumed in homes, shops/stores, business buildings, and the like by using not only electric power supplied from a power company (hereinafter, system electric power) but also electric power supplied by discharging a storage battery. A storage battery is charged in advance by consuming system electric power, and thereby, it is able to discharge to supply power at a desired timing. This makes it possible for a user of such a power supply system to change the timing of consuming the system electric power by controlling timings of charging and discharging the storage battery.

Generally, power companies charge a combination of a fixed basic charge and a metered charge for their system electric power. Besides, power companies are allowed to make contract with their customers to charge their customers the metered charge at different rates at different times of day. Thus, a customer under such a contract is able to reduce the electric power charge (metered charge) that he/she pays to a power company by using the above power supply system to charge the storage battery with electric power by consuming the system electric power when the rate of the metered charge is low, and to supply electric power by discharging the storage battery when the rate of the metered charge is high.

Furthermore, in the above contract, power companies often set the rate of the metered charge to be high at times of day when there is a large demand for system electric power, and to be low at times of day when the demand for system electric power is smaller. This is for the purpose of leveling out the demand for system electric power to thereby make it possible for power companies to realize efficient generation of system electric power. If power companies are able to efficiently generate system electric power (in particular, by thermal power generation), it is possible to reduce $CO_2$ emission from the power generation. Thus, no matter what contract a customer has with a power company, it is preferable to the customer, from a viewpoint of reducing $CO_2$ emission, to charge the storage battery when the demand for system electric power is small and to discharge the storage battery when the demand for system electric power is large.

Besides, as an example of such a power supply system that controls charging and discharging of a storage battery, for example, Patent Literature 1 listed below proposes an electric power supply system that performs simulation of charging and discharging of a storage battery, and charges and discharges the storage battery to reduce cost.

CITATION LIST

Patent Literature

Patent Literature 1: JP-A-2005-143218

SUMMARY OF INVENTION

Technical Problem

However, with the power supply system described in Patent Literature 1, since too high a priority is put on cost reduction, the storage battery is not used effectively or degradation of the storage battery (such as reduction in life span, capacity reduction, and the like; the same shall apply hereinafter) is promoted, which is disadvantageous. Besides, if the simulation is not performed with sufficient accuracy, no effect can be obtained, and this is also disadvantageous. On the other hand, efforts to improve the simulation accuracy result in a more complex configuration, increase in power consumption, and the like, and increase the cost instead, and this is also disadvantageous.

Figure 6:
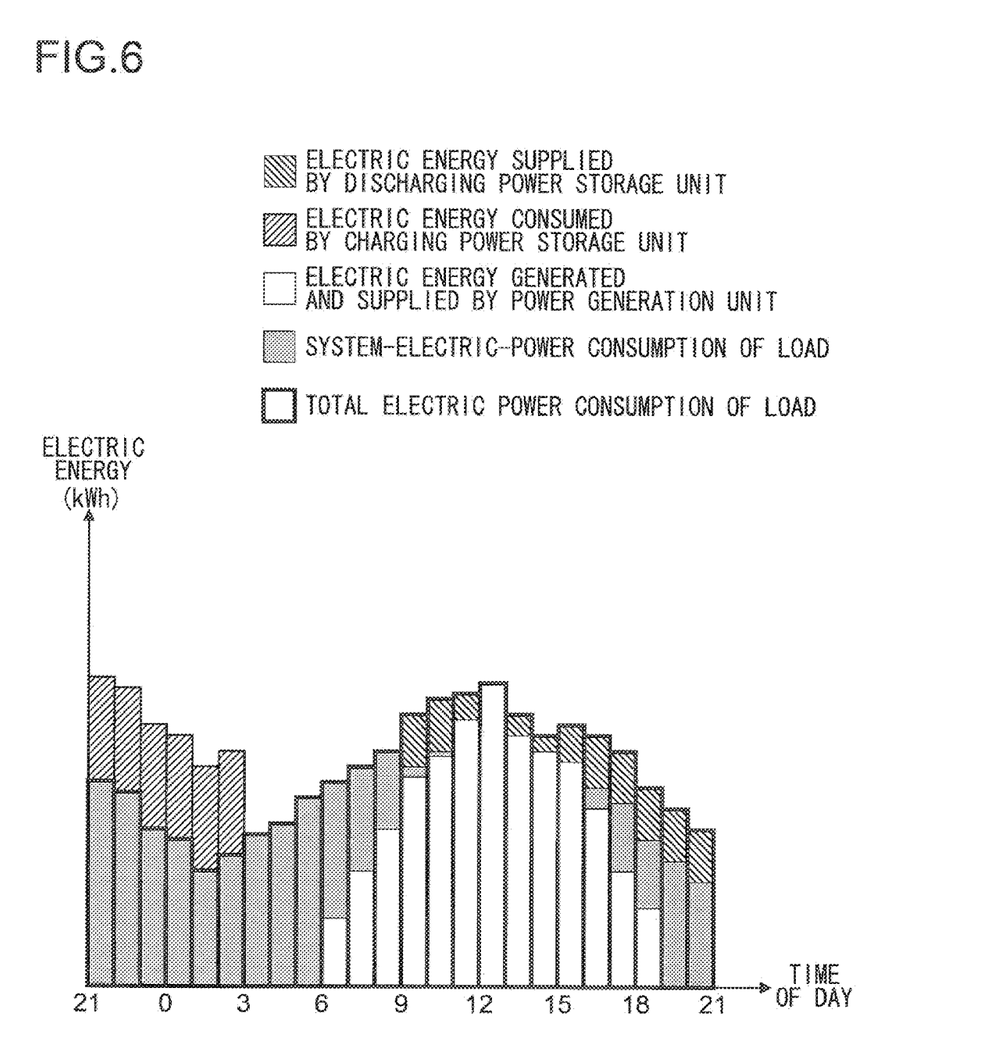
FIG. 6 is a graph showing an example of discharging and charging methods that do not make effective use of a storage battery and promote degradation of a storage battery.

With reference to a figure, a description will be give of an example of discharging and charging methods that do not make effective use of a storage battery and promote degradation of the storage battery. FIG. 6 is a graph showing an example of discharging and charging methods that do not make effective use of a storage battery and promote degradation of the storage battery. The graph shown in FIG. 6 shows electric energy consumed in a power supply system on an hourly basis.

Also, in FIG. 6, electric energy supplied by discharging the storage battery to be consumed by a load in one hour is indicated by a height of an area with hatching of diagonal lines rising from right to left, while electric energy consumed in one hour to charge the storage battery is indicated by a height of an area with hatching of diagonal lines rising from left to right. In addition, in FIG. 6, electric energy generated and supplied by a power generator such as a solar photovoltaic panel and consumed by the load in one hour is indicated by a height of a white area. Besides, in FIG. 6, electric energy of system electric power consumed by the load in one hour is indicated by a height of a grey area, and a total of electric energy consumed by the load in one hour is indicated by a height of an area enclosed by thick lines.

In the graph shown in FIG. 6, the load consumes electric power such that an system electric power consumption is reduced. Specifically, the load first consumes electric power generated and supplied by the power generator; then, if the load needs to consume still more electric power, the load consumes electric power supplied by discharging the storage battery; and then, if the load needs to consume still more electric power, the load consumes the system electric power.

In the graph of FIG. 6, the storage battery is discharged by a method in which the storage battery is made to discharge at a predetermined electric power continuously from 9:00 to 21:00 such that electric energy that is still able to be discharged from the storage battery (hereinafter, remaining capacity) at the end of the discharging (21:00) is close to substantially zero. In the graph of FIG. 6, the storage battery is charged by a method in which the storage battery is continuously charged at a predetermined electric power from 21:00 to 9:00 such that electric energy that is still able to be charged into the storage battery (hereinafter, chargeable capacity) at the end of the charging (9:00) is close to substantially zero.

In a case of discharging the storage battery as described above, if the power generator generates and supplies a sufficient electric power to cover power consumption by the load as indicated, for example, between 11:00 and 16:00 of FIG. 6, there may arise a situation where the storage battery is not able to discharge a predetermined electric power. In such a situation, remaining capacity of the storage battery at the end of discharging becomes sufficiently larger than substantially zero. Thus, the storage battery is not used effectively, and degradation thereof is promoted by, for example, the storage battery being recharged after being only partially discharged.

On the other hand, by increasing the electric energy to be discharged from the storage battery, it is possible to increase the possibility of the remaining capacity of the storage battery at the end of discharging becoming substantially zero. However, if the storage battery is made to discharge in this way, the remaining capacity of the storage battery may be substantially zero when discharging thereof is necessary, and inconveniently, this makes it impossible to make effective use of the storage battery. Furthermore, a large amount of heat is generated in the storage battery and the storage battery becomes prone to over-discharge, which may disadvantageously promote degradation of the storage battery.

Moreover, in the case of charging the storage battery as described above, as indicated, for example, between 21:00 and 3:00 of FIG. 6, the storage battery is charged with a large electric power, a large amount of heat is generated in the storage battery, and the storage battery becomes prone to overcharge, which may disadvantageously promote degradation of the storage battery.

On the other hand, by reducing the electric energy discharged from the storage battery, it is possible to reduce degradation of the storage battery. However, the chargeable capacity of the storage battery at the end of charging is sufficiently larger than substantially zero, and this may disadvantageously make it impossible to make effective use of the storage battery.

In view of the aforementioned problems, an object of the present invention is to provide a power supply system in which a power storage unit is effectively used and degradation of the power storage unit is reduced.

Solution to Problem

To achieve the above object, according to one aspect of the present invention, a power supply system includes a power storage unit that is charged with supplied electric power, and discharges charged electric power to supply electric power, and a power storage unit controller that controls discharging of the power storage unit. Here, the power storage unit controller sets a discharging time during which the power storage unit is allowed to discharge, and the power storage unit controller, during the discharging time, based on remaining discharging time and electric energy dischargeable from the power storage unit, determines electric energy to be supplied by discharging the power storage unit during the remaining discharging time.

In the above-configured power supply system, the discharging time may include a plurality of unit times, and when each of the plurality of unit times is started, the power storage unit controller may determine electric energy to be supplied by discharging the power storage unit in each of the plurality of unit times.

With this configuration, the electric energy to be supplied by discharging the power storage unit is controlled in each of the unit times included in the discharging time. This makes it possible to control the discharging of the power storage unit in an accurate and easy manner.

In the above-configured power supply system, the power storage unit controller may determine electric energy to be supplied by discharging the power storage unit in a unit time that is to start to be electric energy obtained by dividing the electric energy dischargeable from the power storage unit by a number of unit times included in the remaining discharging time.

With this configuration, it is possible to level out the electric energy that the power storage unit supplies by discharging in each of the unit times included in the discharging time. This helps reduce degradation of the power storage unit.

In the above-configured power supply system, there may further be provided a power generation unit that generates and supplies electric power, and the power storage unit controller may set the discharging time such that at least part of the discharging time overlaps with a time during which the power generation unit is able to generate electric power.

With this configuration as well, the power supply system of the present invention is able to make the power storage unit discharge accurately and adaptively. Thus, it is possible to set the discharging time without any special consideration given to whether a current time is in a time period when there is a chance of the discharging of the power storage unit being obstructed by electric power generated and supplied by the power generation unit.

In the above-configured power supply system, the power generation unit may generate electric power by converting energy emitted by the sun into electric energy, and the power storage unit controller may set the discharging time such that at least part of the discharging time overlaps with daytime during which the power generation unit is able to generate electric power.

With this configuration, in the daytime period when there is a large demand for system electric power, it is possible to make use of the unlimited energy to generate electric power with no emission of $CO_2$. As a result, it is possible to reduce electric power cost and $CO_2$ emission.

In the above-configured power supply system, the power storage unit controller may be able to control the charging of the power storage unit, the power storage unit controller may set a charging time during which the power storage unit is allowed to be charged, the charging time may include a plurality of unit times, and, when the charging time is started, the power storage unit controller may determine the electric energy to be supplied to charge the power storage unit in each of the unit times to be electric energy obtained by dividing the electric energy with which the power storage unit is able to be charged by the unit times included in the charging time.

With this configuration, it is possible to level out the electric energy consumed by the power storage unit to charge itself in each of the unit times included in the charging time. This helps reduce degradation of the power storage unit.

Advantageous Effects of Invention

With the configurations of the present invention, it is possible to determine, during the discharging time, the electric energy to be discharged from the power storage unit in a remaining discharging time. This makes it possible to make the power storage unit discharge in an accurate and easy manner. This in turn makes it possible to easily reduce the remaining capacity of the power storage unit to be substantially zero at the end of the discharging time. Thus, it is possible to make effective use of the power storage unit and reduce degradation of the power storage unit.

The significance and benefits of the invention will be clearer from the following description of its embodiments. It should however be understood that these embodiments are merely examples of how the invention is implemented, and that the meanings of the terms used to describe the invention and its features are not limited to the specific ones in which they are used in the description of the embodiments.

DESCRIPTION OF EMBODIMENTS

A description will be given below of a power supply system embodying the present invention, with reference to accompanying drawings. First, an example will be described of a configuration and an operation of the power supply system embodying the present invention, with reference to relevant drawings.

<Example of Configuration of Power Supply System>

Figure 1:
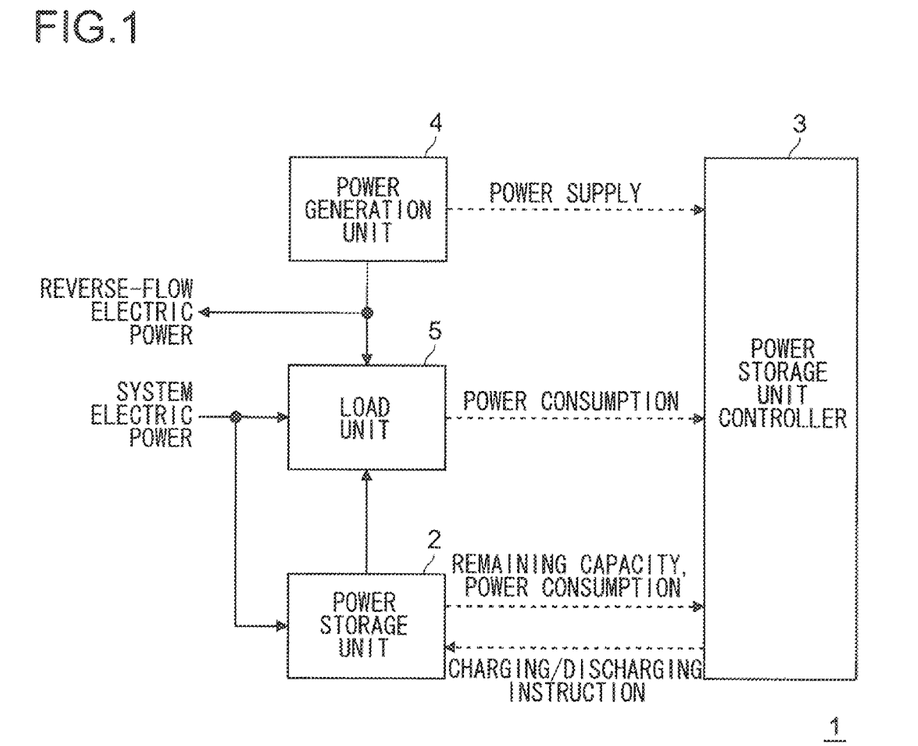
FIG. 1 is a block diagram showing an example of a configuration of a power supply system embodying the present invention.

FIG. 1 is a block diagram showing an example of the configuration of the power supply system embodying the present invention. In the figure, among arrows connecting blocks, solid-line arrows indicate transfer of electric power, while broken-line arrows indicate transfer of information.

The power supply system 1 shown in FIG. 1 includes a power storage unit 2 which consumes system electric power to charge itself and supplies the thus charged electric power by discharging, a power storage unit controller 3 which controls charging and discharging of the power storage unit 2, a power generation unit 4 which generates and supplies electric power, and a load 5 which consumes at least one of the system electric power, the electric power supplied by discharging the power storage unit 2, and the electric power generated and supplied by the power generation unit 4.

The power storage unit 2 is composed of, for example, a large capacity storage battery; it properly converts the system electric power it receives (for example, it converts AC electric power into DC electric power) to charge itself with the converted electric power, and properly converts the electric power that it is charged with (for example, it converts DC electric power into AC electric power) and supplies the thus converted electric power to the load 5. In addition, the power storage unit 2 informs the power storage unit controller 3 of, for example, electric energy that the power storage unit 2 has consumed to charge itself (or electric energy consumed within a predetermined time) and its estimated remaining capacity. For example, the power storage unit 2 estimates its remaining capacity by, for example, measuring electric energy charged and discharged and an amount of current, and having a table showing relationship between voltage level and remaining capacity of the power storage unit 2 such that the storage unit 2 measures its voltage level and refers to the table.

The power generation unit 4, for example, generates electric power by using solar energy (sunlight, solar heat, and the like) and supplies the thus-generated electric power. In addition, the power generation unit 4 informs the power storage unit controller 3 of electric energy that it has generated and supplied to the load 5 (or, electric energy supplied within a predetermined time). The power generation unit 4 may be one that generates electric power by using a method other than using solar energy (for example, power generation by making use of chemical energy, which is performed by fuel cells and the like). However, if a power generation unit that generates electric power by using solar energy is adopted as the power generation unit 4, it is possible to generate electric power by using unlimited energy with no emission of $CO_2$ at all in the daytime when there is a large demand for system electric power. As a result, it is possible to reduce electric power cost and $CO_2$ emission, which is preferable. Besides, if the power generation unit 4 generates more electric power than is required (than can be completely consumed) in the power supply system 1, a surplus of the electric power can be sold to a power company as reverse-flow electric power.

The load 5 includes various kinds of loads that operate by consuming electric power supplied thereto (such as lighting apparatuses, air conditioning apparatuses, and refrigerators provided in homes, shops, stores, and the like). In addition, the load 5 informs the power storage unit controller 3 of electric power it has consumed (or electric energy it has consumed within a predetermined time).

Based on the information of the remaining capacity received from the power storage unit 2 and the information of the electric power consumed (or electric energy consumed) received from the power storage unit 2 and the load 5, the power storage unit controller 3 controls such that the power storage unit 2 charges itself (gives the power storage unit 2 a charging instruction), and controls such that the power storage unit 2 discharges (gives the power storage unit 2 a discharging instruction).

In addition, the power storage unit controller 3 sets a charging time when it is possible to charge the power storage unit 2, and a discharging time when it is possible to discharge the power storage unit 2. The charging time and the discharging time are able to be properly set based on various viewpoints. For example, in a case where the charging time and the discharging time are set based on viewpoints of reducing power cost and $CO_2$ emission, a time when the electric power rate is low or a time when the demand for system electric power is small is set as the charging time, while a time when the electric power rate is high or a time when the demand for system electric power is large is set as the discharging time.

The charging time and the discharging time may each include a plurality of unit times. A unit time is a time unit based on which the power storage unit controller 3 controls the power storage unit 2, and a unit time may be of any length such as, for example, 30 minutes, 1 hour, etc. The unit times included in the charging time or the discharging time may each be of substantially the same length, or may include a unit time whose length is different from the length of the other unit times. However, the following descriptions given below of operation examples and operation result examples of the power supply system 1, for the sake of a concrete description, deal with cases where the charging time and the discharging time both include unit times all having substantially the same length (1 hour).

The power storage unit controller 3, for example, records the set charging time and the set discharging time, and counts time; thereby the power storage unit controller 3 is able to grasp a time (such as the charging time and the discharging time) to which a current time of day belongs and remaining time of the time.

In addition to (or instead of) electric power generated and supplied by the power generation unit 4 being consumed by the operation of the load 5, the electric power may be consumed to charge the power storage unit 2.

Besides, the load 5 may inform the power storage unit controller 3 of electric power (or electric energy) of system electric power consumed by the load 5; alternatively, the load 5 may inform the power storage unit controller 3 of total electric power (electric power including the system electric power, the electric power supplied by discharging the power storage unit 2, and the electric power generated and supplied by the power generation unit 4) that the load 5 has consumed. Even in the latter case, since the power storage unit controller 3 is able to grasp the electric power (or the electric energy) supplied by discharging the power storage unit 2 and the electric power (or the electric energy) generated and supplied by the power generation unit 4, the power storage unit controller 3 is able to grasp the electric power (or the electric energy) of the system electric power consumed by the load 5.

Besides, the power storage unit controller 3 may set a time (for example, a waiting time during which neither charging nor discharging is performed) other than the charging time and the discharging time. However, in the following examples of the operation and the operation result of the electric power supply system, for concrete descriptions, cases are dealt with where the power storage unit controller 3 sets only the charging time and the discharging time.

<Example of Operation of Power Supply System>
[Outline]

Figure 2:
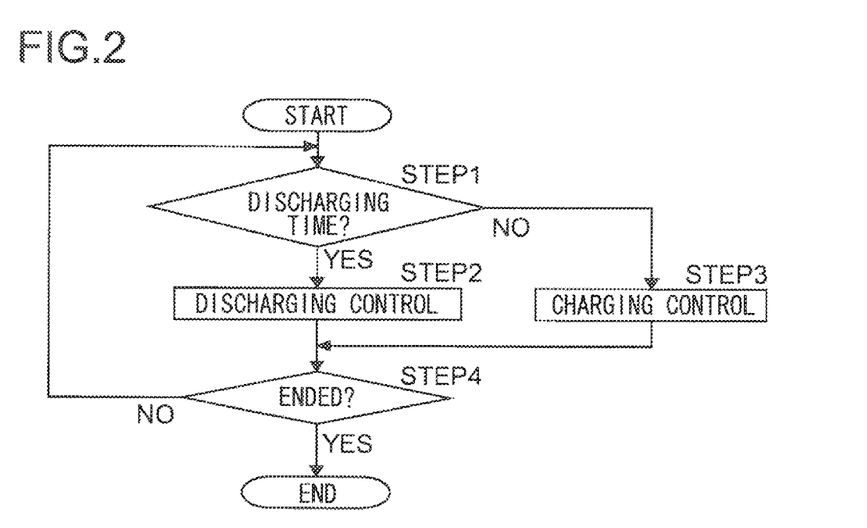
FIG. 2 is a flow chart showing a schematic example of an overall operation of the power supply system of FIG. 1.

A description will be given below of an example of the operation of the electric power supply system 1 (chiefly an example of a control operation performed by the power storage unit controller 3) of the present embodiment, with reference to the accompanying drawings. First, a schematic example of a general operation of the power supply system 1 will be described with reference to FIG. 2. FIG. 2 is a flow chart showing the schematic example of the general operation of the power supply system of FIG. 1.

As shown in FIG. 2, in the power supply system 1 of the present embodiment, first, the power storage unit controller 3 checks which of the charging time and the discharging time a current time of day belongs to (STEP 1). In a case where the current time of day belongs to the discharging time (STEP 1, YES), the power storage unit controller 3 performs discharging control (STEP 2). On the other hand, in a case where the current time of day does not belong to the discharging time (that is, belongs to the charging time) (STEP 1, NO), the power storage unit controller 3 performs charging control (STEP 3).

After performing the discharging control in STEP 2 or the charging control in STEP 3, the power storage unit controller 3 determines whether or not to end the operation of the power supply system 1 (STEP 4). In a case where the operation of the power supply system 1 is not to be ended (STEP 4, NO), the power storage unit controller 3 returns to STEP 1 to check the time to which the current time of day belongs. On the other hand, in a case where the operation of the power supply system 1 is to be ended (STEP 4, YES), the power storage unit controller 3 makes the operation of the power supply system 1 stop.

[Discharging Control]

Figure 3:
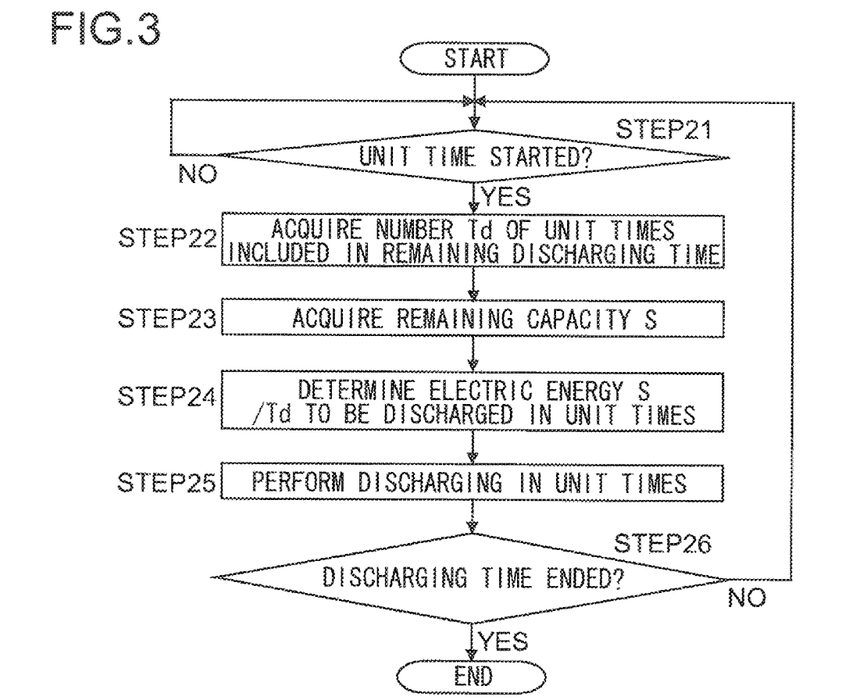
FIG. 3 is a flow chart showing an example of discharging control performed by a power storage unit controller of the power supply system of FIG. 1.

With reference to FIG. 3, a description will be given of the discharging control performed in STEP 2 in FIG. 2. FIG. 3 is a flow chart showing an example of the discharging control performed by the power storage unit controller of the power supply system of FIG. 1.

As shown in FIG. 3, on starting the discharging control, the power storage unit controller 3 waits until a unit time starts (STEP 21, NO). Then, on detecting start of the unit time (STEP 21, YES), the power storage unit controller 3 starts to perform the following process in order to determine electric energy to be discharged from the power storage unit 2 in the unit time.

First, the power storage unit controller 3 acquires a number Td of unit times included in remaining discharging time (STEP 22). The unit time whose start has been detected in STEP 21 is counted in the number Td of the unit times. In addition, the power storage unit controller 3 acquires remaining capacity S of the power storage unit 2 (STEP 23). The power storage unit controller 3 may perform STEP 22 and STEP 23 in the reverse order.

The power storage unit controller 3 determines the electric energy to be discharged in the unit time whose start has been detected in STEP 21 to be S/Td (STEP 24). And the power storage unit controller 3 outputs a discharging instruction to the power storage unit 2 such that the electric energy S/Td will be discharged in the unit time in so far as it is possible (STEP 25). The electric energy S/Td can be interpreted as a maximum value of the electric energy to be discharged in the unit time, and the electric energy to be discharged from the power storage unit 2 in the unit time may be S/Td or smaller.

Then, when the discharging of the power storage unit 2 in the unit time whose start has been detected in STEP 21 is finished, the power storage unit controller 3 checks whether or not the discharging time has ended (STEP 26). If the power storage unit controller 3 finds that the discharging time has not ended yet (STEP 26, NO), the power storage unit controller 3 returns to STEP 21 to detect start of the next unit time. On the other hand, the power storage unit controller 3 finishes the discharging control if it finds that the discharging time has ended (STEP 26, YES).

With the above configuration, it is possible to determine, during the discharging time, the electric energy to be discharged from the power storage unit 2 in the remaining discharging time. This makes it possible to discharge the power storage unit 2 in an accurate and adaptive manner. This makes it possible to easily reduce the remaining capacity of the power storage unit 2 to be substantially zero at the end of the discharging time, and as a result, it is possible to make effective use of the power storage unit 2 and reduce degradation of the power storage unit 2.

Furthermore, by controlling the electric energy to be supplied by discharging the power storage unit 2 in each of the unit times included in the discharging time, it is possible to control the discharging of the power storage unit 2 in an accurate and easy manner.

Moreover, by making S/Td the electric energy to be discharged from the power storage unit 2 in each of the unit times included in the discharging time, it is possible to level out the electric energy that the power storage unit 2 supplies by discharging in each of the unit times. This helps reduce degradation of the power storage unit 2.

In a case where the unit times included in the discharging time include a unit time whose length is different from the length of the other unit times, the electric energy to be discharged in a given unit time may be calculated by (the remaining capacity S when start of a given unit time is detected)×(the length of the given unit time)/(the remaining discharging time).

[Charging Control]

Figure 4:
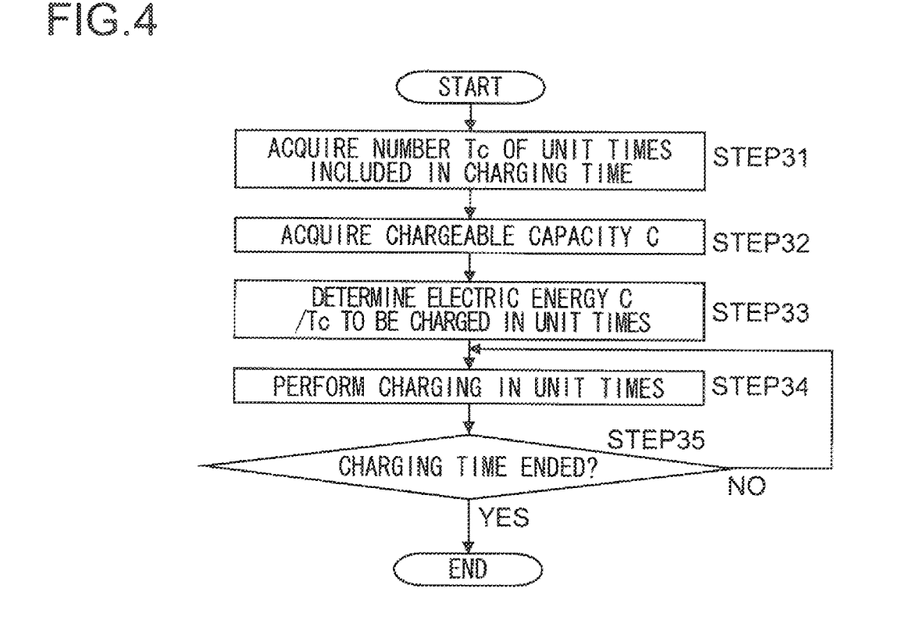
FIG. 4 is a flow chart showing an example of charging control performed by the power storage unit controller of the power supply system of FIG. 1.

With reference to FIG. 4, a description will be given of the charging control performed in STEP 3 in FIG. 2. FIG. 4 is a flow chart showing an example of the charging control performed by the power storage unit controller of the power supply system of FIG. 1.

As shown in FIG. 4, on starting the charging control (when the charging time starts), the power storage unit controller 3, acquires a number Tc of unit times included in the charging time (STEP 31). In addition, the power storage unit controller 3 acquires chargeable capacity C of the power storage unit 2 (STEP 32). The power storage unit controller 3 may record electric energy (remaining capacity at full charge) dischargeable when the power storage unit 2 is fully charged, and acquire the chargeable capacity C by subtracting, from the electric energy, remaining capacity acquired from the power storage unit 2. The power storage unit controller 3 may perform STEP 31 and STEP 32 in the reverse order.

The power storage unit controller 3 determines electric energy to be charged in each of the unit times included in the charging time to be C/Tc (STEP 33). Then, the power storage unit controller 3 outputs a charging instruction to the power storage unit 2 such that the power storage unit 2 will be charged with electric energy C/Tc in each unit time (STEP 34).

Then, when the charging of the power storage unit 2 in a given unit time is finished, the power storage unit controller 3 checks whether or not the charging time has ended (STEP 35). If the power storage unit controller 3 finds that the charging time has not ended yet (STEP 35, NO), the power storage unit controller 3 returns to STEP 34, and performs charging in the next unit time. On the other hand, the power storage unit controller 3 finishes the charging control if it finds that the charging time has ended (STEP 35, YES).

With this configuration, it is possible to level out the electric energy consumed by the power storage unit 2 to charge itself in each of the unit times included in the charging time. This helps reduce degradation of the power storage unit 2.

The charging control may be performed in the same manner as the discharging control shown in FIG. 3. For example, each time the power storage unit controller 3 detects start of a unit time, the power storage unit controller 3 may determine the electric energy to be charged in the unit time (which corresponds to STEP 21 to STEP 24, and STEP 26 in FIG. 3), and perform charging in the unit time (which corresponds to STEP 25 in FIG. 3). Such charging control is preferably applicable to a case where there is a factor that limits the charging of the power storage unit 2 during the charging time (for example, a case where an upper limit is set to electric energy of system electric power that can be consumed in a unit time).

Furthermore, in a case where the unit times included in the charging time include a unit time whose length is different from the length of the other unit times, the electric energy to be charged in a given unit time may be (chargeable capacity C)×(length of a given unit time)/(charging time). Moreover, here, in a case where the charging control is performed in the same method as the discharging control in FIG. 3, the electric energy to be charged in a given unit time may be (chargeable capacity C when start of a given unit time is detected)×(length of the given unit time)/(remaining charging time).

<Example of Operation Result of Power Supply System>

Figure 5:
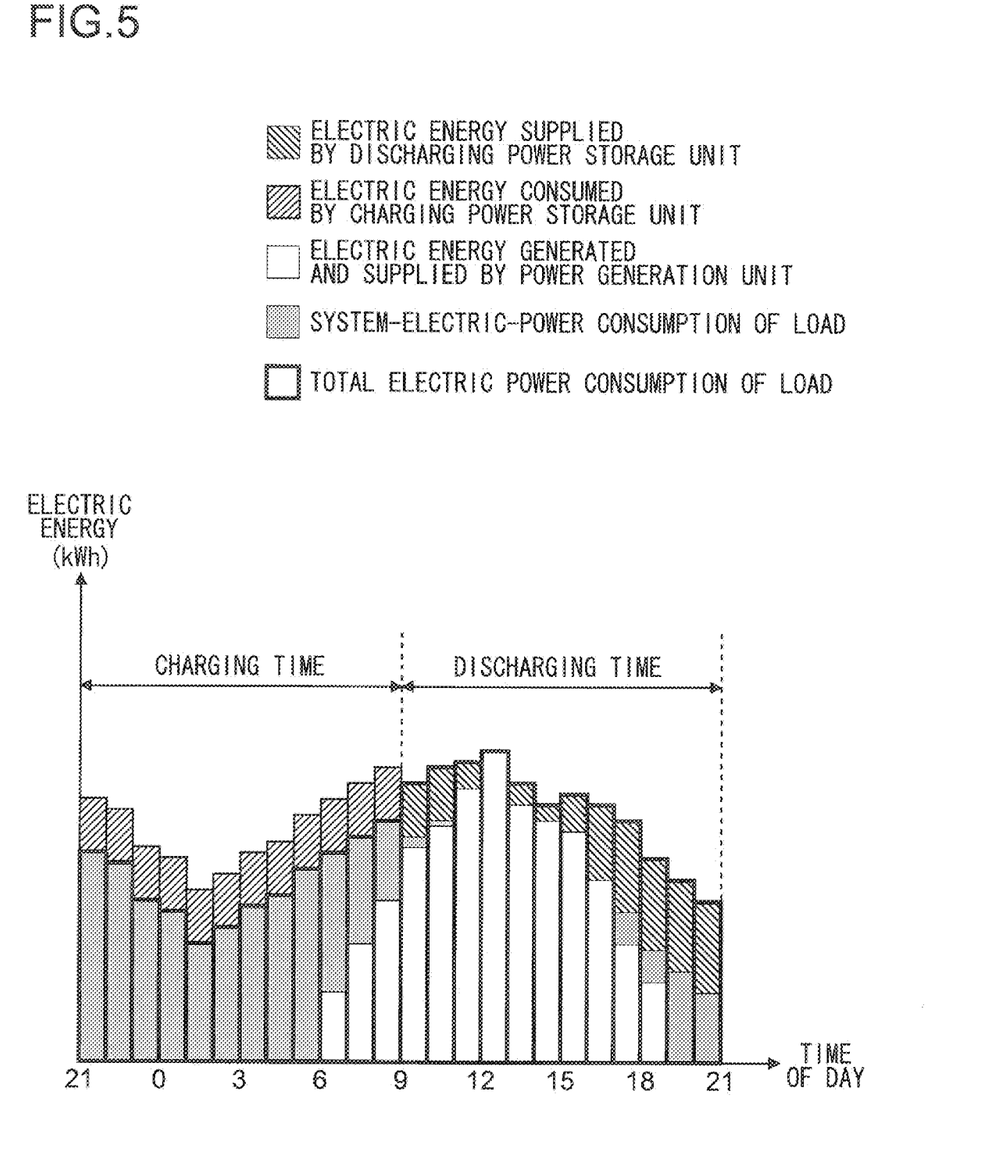
FIG. 5 is a graph showing an example of a result of an operation performed by the power supply system of FIG. 1.

With reference to relevant drawings, an example will be described of an operation result of a case where the power supply system 1 performs operations shown in FIGS. 2 to 4. FIG. 5 is a graph showing an example of a result of an operation performed by the power supply system of FIG. 1. FIG. 5 can be contrasted with FIG. 6 which shows an example of discharging and charging methods that do not make effective use of a storage battery and promote degradation of the storage battery.

In the graph shown in FIG. 5, the charging time is set to from 21:00 to 9:00 and the discharging time is set to from 9:00 to 21:00; in both of the charging time and the discharging time, unit times of one hour each are set to start on the hour every hour. The graph shown in FIG. 5 shows electric energy consumed in the power supply system 1 in each of the unit times.

In FIG. 5, electric energy supplied by discharging the power storage unit 2 and consumed by the load 5 in each of the unit times is indicated by a height of an area with hatching of diagonal lines rising from right to left, while electric energy consumed to charge the power storage unit 2 is indicated by a height of an area with hatching of diagonal lines rising from left to right. Besides, in FIG. 5, electric energy generated and supplied by the power generation unit 4 and consumed by the load 5 in each of the unit times is indicated by a height of a white area. In addition, in FIG. 5, electric energy of system electric power consumed by the load 5 in each of the unit times is indicated by a height of a grey area, and a total of electric energy consumed by the load 5 in each of the unit times is indicated by a height of an area enclosed by thick lines.

In the graph shown in FIG. 5, the power supply system 1 controls electric power consumed by the load 5 such that the system electric power consumption is reduced. Specifically, for example, the load 5 first consumes the electric power generated and supplied by the power generation unit 4; then, if the load needs to consume still more electric power, the load consumes the electric power supplied by discharging the power storage unit 2; and then, if the load 5 needs to consume still more electric power, the load 5 consumes the system electric power.

In this case, if the power generation unit 4 generates and supplies electric power sufficient to cover power consumption by the load 5 as indicated, for example, between 11:00 and 17:00 of FIG. 5, there may arise a situation where it is impossible to make the power storage unit 2 discharge the electric energy S/Td to be discharged from the power storage unit 2 in a unit time.

However, with the power supply system 1 of the present embodiment, as indicated, for example, from 17:00 to 21:00 in FIG. 5, it is possible to increase accurately and adaptively the electric energy S/Td to be discharged from the power storage unit 2 in a unit time. This makes it possible to easily reduce the remaining capacity of the power storage unit 2 to be substantially zero at the end of the discharging time, and as a result, it is possible to make effective use of the power storage unit 2 and reduce degradation of the power storage unit 2.

Thus, with the power supply system 1 of the present embodiment, it is possible to make the power storage unit 2 discharge accurately and adaptively. Thus, it is possible to set the discharging time without any special consideration given to whether it is time when there is a chance for discharging of the power storage unit 2 to be obstructed by electric power generated and supplied by the power generation unit 2.

Also, with the power supply system 1 of the present embodiment, it is possible to level out electric energy consumed to charge the power storage unit 2 over the entire charging time, as indicated, for example, from 21:00 to 9:00 in FIG. 5. This helps reduce degradation of the power storage unit 2.

Modified Example 1

In the power supply system 1 embodying the present invention, part or all of operations of the power storage unit controller 3, for example, may be performed by a control device such as a microcomputer. Furthermore, all or part of the functions realized by such a control device may be prepared in the form of a computer program so that those functions—all or part—are realized as the computer program is executed on a program execution device (for example, a computer).

Besides, without limitation to the above, it is possible to realize the power supply system 1 shown in FIG. 1 with hardware or with a combination of hardware and software. In a case in which part of the power supply system 1 is realized by using software, a block for the part realized by the software indicates a functional block of the portion.

Modified Example 2

As shown in FIG. 1, electric power is allowed to flow reversely from the power generation unit 4 to the system electric power; thus, by performing control such that a surplus of electric power from the power generation unit 4 flows reversely to the system electric power, it is possible to discharge the power storage unit at a constant discharging rate to reduce degradation of the life span of the storage battery and to make what is called electric power selling possible. In a case where the power generation unit 4 performs photovoltaic power generation, in the daytime when electric power is able to be obtained by discharging the power storage unit 2 and by photovoltaic power generation, electric energy required by the load is supplied by the photovoltaic power generation and by discharging the storage battery. A description will be given below of the control of the present modified example, based on the flow chart of FIG. 7. On starting the discharging control, the power storage unit controller 3 waits until a unit time is started (STEP 41, NO). Then, on detecting start of the unit time (STEP 41, YES), the power storage unit controller 3 starts to perform the following process in order to determine electric energy to be discharged from the power storage unit 2 in the unit time.

Figure 7:
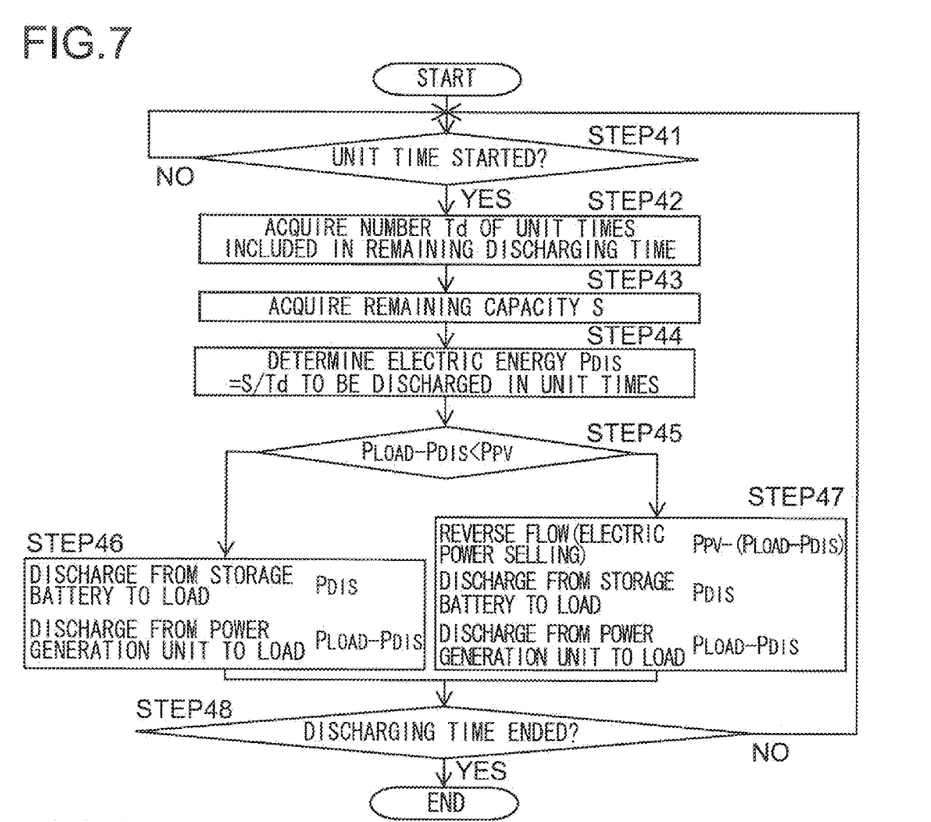
FIG. 7 is a flow chart showing an example of discharging control performed by a power storage unit controller of a power supply system according to a modified example of the present invention.

First, the power storage unit controller 3 acquires the number Td of unit times included in remaining discharging time (STEP 42). The unit time whose start has been detected in STEP 41 is counted in the number Td of the unit times. In addition, the power storage unit controller 3 acquires the remaining capacity S of the power storage unit 2 (STEP 43). Then, the power storage unit controller 3 judges whether or not the following relational formula holds (STEP 45):

$$P_{LOAD} - P_{DIS} < P_{PV}$$

where $P_{LOAD}$ indicates electric energy that the load requires;

$P_{DIS}$ indicates electric energy discharged by the storage battery; and $P_{PV}$ indicates electric energy generated by the power generation unit.

Figure 8:
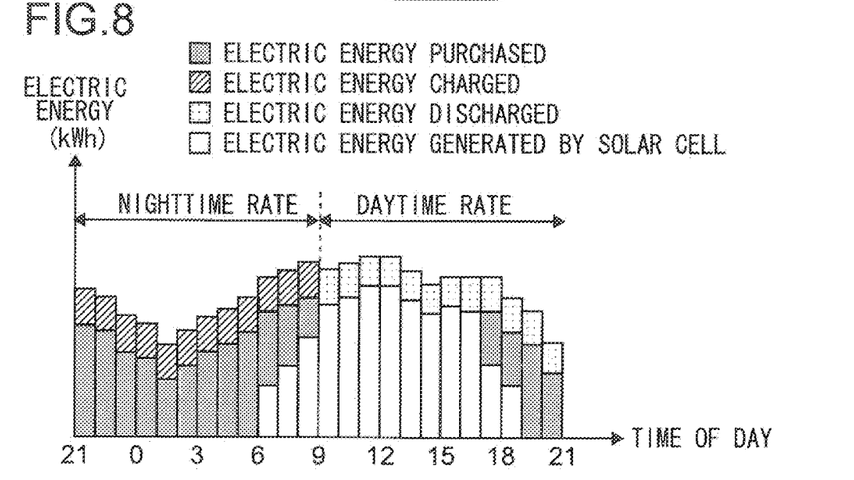
FIG. 8 is a flow chart showing an example of a result of an operation of the power supply system according to the modified example of the present invention.

That is, whether or not, when the maximum electric energy dischargeable from the storage battery in a unit time is supplied to the load that requires electric energy in the unit time, there is a surplus of the electric power generated by the power generation unit is judged. If it is judged that the relational formula holds, that is, if it is judged that there is a surplus of the electric power generated by the photovoltaic power generation (STEP 45, YES), the surplus, $P_{PV} - (P_{LOAD} - P_{DIS})$, of the electric power generated by the photovoltaic power generation is made to reversely flow to the system side, and also, $P_{DIS}$ is discharged from the storage battery to the load, and the photovoltaic power generation unit discharges $P_{LOAD} - P_{DIS}$ to the load (STEP 47). On the other hand, if it is judged, in STEP 45, that the relational formula does not hold, that is, if it is judged that there is not a surplus of the electric power generated by the photovoltaic power generation (STEP 45, NO), $P_{DIS}$ is discharged from the storage battery to the load, and $P_{PV}$ is discharged from the photovoltaic power generation unit to the load (STEP 46). The control of the above STEP 41 to STEP 46, and STEP 47 is repeatedly performed until the end of a daytime rate time (STEP 48). In this way, as shown in FIG. 8, in the daytime rate time lasting from 9:00 to 21:00, the discharging from the storage battery is continuously carried out at a fixed rate, while the surplus of the electric power generated by the photovoltaic power generation is made to reversely flow to the system. Thus, electric power is supplied to the load in such a manner that the electric energy to be discharged from the storage battery is determined for each of the unit times one by one in accordance with variation in the electric energy that the load requires in each unit time, and the electric energy charged in the storage battery by consuming the system electric power at a nighttime rate is first used as determined; this makes it possible to maximize the surplus electric energy generated by the photovoltaic power generation that flows reversely to the system.

It should be understood that the embodiments specifically described above are not meant to limit the present invention, and that many variations and modifications can be made within the spirit of the present invention.

INDUSTRIAL APPLICABILITY

The present invention is applicable to a power supply system that uses electric power supplied by discharging a power storage unit.

LIST OF REFERENCE SYMBOLS 1 power supply system
2 power storage unit
3 power storage unit controller
4 load
5 power generation unit

The invention claimed is:

1. A power supply system, comprising:
a power storage unit that is charged with electric power, and discharges charged electric power to supply electric power to a load; and
a controller that
determines discharging time including a plurality of successive time periods, the discharging of the electric power from the power storage unit being managed for each time period to complete the discharge of the electric power from the power storage unit within the discharging time,
in a first discharge control shift from a first time period to a second time period, the first time period and the second time period being immediately adjacent time periods in the successive time periods, acquires remaining electric energy [Wh] dischargeable from the power storage unit, determines first electric energy [Wh] to be discharged from the power storage unit during the second time period, based on remaining discharging time from starting of the second time period to a predetermined time and the remaining electric energy [Wh] dischargeable from the power storage unit, by dividing the remaining electric energy [Wh] dischargeable from the power storage unit by a number of time periods (N) in the remaining discharging time,
controls the power storage unit to discharge the determined first electric energy [Wh] from the power storage unit during the second time period,
in a second discharge control shift from the second time period to a third time period, the second time period and the third time period being immediately adjacent time periods in the successive time periods, acquires updated remaining electric energy [Wh] dischargeable from the power storage unit after discharging the determined first electric energy, determines second electric energy [Wh] to be discharged from the power storage unit during the third time period, based on remaining discharging time from starting of the third time period to the predetermined time and the updated remaining electric energy [Wh] dischargeable from the power storage unit, by dividing the updated remaining electric energy [Wh] dischargeable from the power storage unit by (N−1) in the remaining discharging time, and
controls the power storage unit to discharge the determined second electric energy [Wh] from the power storage unit during the third time period.

2. The power supply system according to claim 1, wherein the controller determines the electric energy [Wh] to be discharged during the subsequent time period such that the remaining electric energy [Wh] in the power storage unit before the subsequent time period starts is completely discharged within the remaining discharging time.

3. The power supply system according to claim 1, further comprising a power generation unit that generates and supplies electric power to the load, wherein
when the load requires electric energy [Wh] less than a total of the electric energy [Wh] to be generated by the power generation unit and the electric energy [Wh] to be discharged from the power storage unit during the subsequent time period, causing a part of the electric power generated by the power generation unit during the subsequent time period to become surplus power, the surplus power is supplied to a destination other than the load.

4. The power supply system according to claim 3, wherein the power generation unit is a solar photovoltaic system.

5. The power supply system according to claim 1, further comprising a power generation unit that generates and supplies electric power to the load, wherein
when the load requires electric energy [Wh] more than a total of the electric energy [Wh] to be generated by the power generation unit and the electric energy [Wh] to be discharged from the power storage unit during the subsequent time period, the controller
controls the power storage unit to discharge more than the determined electric energy [Wh], and
determines that electric energy [Wh] to be discharged from the power storage unit during a time period after the subsequent time period becomes less than the electric energy determined to be discharged during the subsequent time period.

6. The power supply system according to claim 1, further comprising a power generation unit that generates and supplies electric power to the load, wherein
when the load requires electric energy [Wh] more than the electric energy [Wh] to be generated by the power generation unit during the subsequent time period, but requires electric energy [Wh] less than a total of the electric energy [Wh] to be generated by the power generation unit and the electric energy [Wh] to be discharged from the power storage unit during the subsequent time period, the controller
reduces the electric energy [Wh] to be discharged from the power storage unit during the subsequent time period, and
determines that electric energy [Wh] to be discharged from the power storage unit during a time period after the subsequent time period becomes greater than the electric energy [Wh] determined to be discharged during the subsequent time period.

7. A power supply system, comprising:
a power storage unit that is charged with system electric power, and discharges charged electric power to supply electric power to a load; and
a controller that
determines a charging time including a plurality of successive time periods, the charging of the power storage unit being managed for each time period to complete the charge of the power storage unit within the charging time,
in a first charge control shift from a first time period to a second time period, the first time period and the second time period being immediately adjacent time periods in the successive time periods, acquires electric energy [Wh] that is able to be charged into the power storage unit, determines electric energy [Wh] to charge the power storage unit during the second time period, based on remaining charging time from starting of the second time period to a predetermined time and the acquired electric energy [Wh] that is able to be charged into the power storage unit, by dividing the acquired electric energy [Wh] that is able to be charged by a number of time periods (N) in the remaining charging time,
controls the power storage unit to charge based on the determined first electric energy [Wh] during the second time period,
in a second charge control shift from the second time period to a third time period, the second time period and the third time period being immediately adjacent time periods in the successive time periods, acquires updated electric energy [Wh] that is able to be charged into the power storage unit after charging the determined first electric energy, determines second electric energy [Wh] to charge the power storage unit during the third time period, based on remaining charging time from starting of the third time period to the predetermined time and the acquired updated electric energy [Wh] that is able to be charged into the power storage unit, by dividing the acquired updated electric energy [Wh] that is able to be charged by (N−1) in the remaining charging time, and
controls the power storage unit to charge based on the determined second electric energy [Wh] during the third time period.

* * * * *